United States Patent
Higashi et al.

(10) Patent No.: US 9,937,970 B2
(45) Date of Patent: Apr. 10, 2018

(54) METHOD FOR MANUFACTURING TELESCOPIC SHAFT

(71) Applicant: JTEKT CORPORATION, Osaka-shi, Osaka (JP)

(72) Inventors: Kenji Higashi, Tenri (JP); Naoto Miyawaki, Osaka (JP)

(73) Assignee: JTEKT CORPORATION, Osaka-shi (JP)

( * ) Notice: Subject to any disclaimer, the term of this patent is extended or adjusted under 35 U.S.C. 154(b) by 453 days.

(21) Appl. No.: 14/596,603

(22) Filed: Jan. 14, 2015

(65) Prior Publication Data
US 2015/0203163 A1    Jul. 23, 2015

(30) Foreign Application Priority Data
Jan. 21, 2014  (JP) ................................ 2014-008631

(51) Int. Cl.
*F16C 3/03*       (2006.01)
*B62D 65/00*      (2006.01)
(Continued)

(52) U.S. Cl.
CPC ............... *B62D 65/00* (2013.01); *F16C 3/03* (2013.01); *F16C 33/20* (2013.01); *F16C 33/208* (2013.01);
(Continued)

(58) Field of Classification Search
CPC ....... B62D 65/00; F16D 3/06; F16D 2300/10; F16D 2250/0046; F16C 3/03; F16C 33/208; F16C 33/20; Y10T 29/4984
See application file for complete search history.

(56) References Cited

U.S. PATENT DOCUMENTS 5,830,071 A * 11/1998 Castellon ............... F16C 3/03
                                                403/359.5
9,446,782 B2 * 9/2016 Kurokawa ................ F16D 3/06
(Continued)

FOREIGN PATENT DOCUMENTS

EP        2 282 071 A2    2/2011
EP        2 759 727 A2    7/2014
(Continued)

OTHER PUBLICATIONS

English translation of JP 2013-213589.*
Sep. 30, 2015 extended Search Report issued in European Patent Application No. 15151447.8.

*Primary Examiner* — Jun Yoo
(74) *Attorney, Agent, or Firm* — Oliff PLC

(57) ABSTRACT

A telescopic shaft includes a hollow outer shaft, an inner shaft spline-fitted to the outer shaft, a resin coating provided on splines on at least one of the outer and inner shafts, and can be extended and contracted in an axial direction. A method for manufacturing the telescopic shaft includes press-fitting the inner shaft into the outer shaft and sliding one of the outer and inner shafts relative to the other of the outer and inner shafts by reciprocating the one shaft in the axial direction. In the sliding, a frequency according to a sliding speed at which the one shaft is slid relative to the other shaft is set to be lower than a predetermined value at the start of sliding, and the frequency is increased in a continuous or stepwise manner when a sliding load of the one shaft to the other shaft is reduced.

4 Claims, 4 Drawing Sheets

(51) Int. Cl.
*F16C 33/20* (2006.01)
*F16D 3/06* (2006.01)

(52) U.S. Cl.
CPC ............ *F16D 3/06* (2013.01); *F16C 2208/60* (2013.01); *F16C 2208/66* (2013.01); *F16C 2208/86* (2013.01); *F16D 2250/0046* (2013.01); *F16D 2300/10* (2013.01); *Y10T 29/4984* (2015.01)

(56) References Cited

U.S. PATENT DOCUMENTS

| | | |
|---|---|---|
| 2011/0030496 A1 | 2/2011 | Tokioka |
| 2014/0041194 A1 | 2/2014 | Kurokawa et al. |
| 2015/0110551 A1* | 4/2015 | Aoki ........................ F16D 1/02 403/359.1 |

FOREIGN PATENT DOCUMENTS

| | | |
|---|---|---|
| JP | 2011038560 A | 2/2011 |
| JP | 2012102868 A | 5/2012 |
| JP | 2013-142437 A | 7/2013 |
| JP | 2013213589 A | 10/2013 |

* cited by examiner

METHOD FOR MANUFACTURING TELESCOPIC SHAFT

INCORPORATION BY REFERENCE

The disclosure of Japanese Patent Application No. 2014-008631 filed on Jan. 21, 2014 including the specification, drawings and abstract, is incorporated herein by reference in its entirety.

BACKGROUND OF THE INVENTION

1. Field of the Invention

The invention relates to a method for manufacturing a telescopic shaft.

2. Description of Related Art

Each of telescopic shafts described in Japanese Patent Application Publication No. 2013-213589 and Japanese Patent Application Publication No. 2012-102868 has a male shaft (an inner shaft), a female shaft (an outer shaft), and a coating portion. The male shaft has a non-circular outer peripheral shape. The female shaft has a non-circular inner peripheral shape. Forming the coating portion on an outer periphery of the male shaft reduces sliding resistance between the outer periphery of the male shaft and an inner periphery of the female shaft. When the telescopic shaft is manufactured, the inner periphery of the female shaft is fitted around the outer periphery of the male shaft with interference therebetween, and the male shaft is then reciprocally slid relative to the female shaft fixed by a processing tool a plurality of number of times in an axial direction. The coating portion is plastically deformed by frictional heat generated by sliding, whereby the interference is reduced. Therefore, the sliding resistance between the female shaft and male shaft can be set to a predetermined value.

In JP 2013-213589 A and JP 2012-102868 A, when the male shaft starts sliding relative to the female shaft, the plastic deformation of the coating portion has not occurred and the coating portion is thick. Therefore, the interference between the inner periphery of the female shaft and the outer periphery of the male shaft is large. Under the influence of such interference and inertia of a moving part in a facility for sliding the male shaft, when the male shaft starts sliding relative to the female shaft, a sliding load of the male shaft is large.

In order to withstand the sliding load, various parts of each of the male and female shafts are required to ensure the strength larger than a predetermined strength. For securing the strength, there is a limit to reduction in cost and weight of the telescopic shaft. In order to reduce the cost and the weight of the telescopic shaft, the sliding load is required to be reduced. If the interference is reduced, the clearance between the female shaft and the male shaft becomes the positive clearance in the worst case, whereby the plastic deformation and welding deformation of the coating portion by the frictional heat cannot be achieved. Alternatively, as a means for reducing the sliding load, it is conceived that a weight of the moving part is reduced to reduce the influence of the inertia of the moving part in the facility. However, it may be difficult to modify the facility due to durability of the facility and the like.

As the means for reducing the sliding load, reducing the interference or reducing the weight of the moving part in the facility is difficult.

SUMMARY OF THE INVENTION

An object of the invention is to provide a method for manufacturing a telescopic shaft, which includes sliding one of outer and inner shafts relative to the other of the outer and inner shafts and is capable of achieving reduction in cost and weight of the telescopic shaft.

A method for manufacturing a telescopic shaft that includes a hollow outer shaft having splines formed on its inner periphery, an inner shaft that has splines formed on its outer periphery and is spline-fitted to the outer shaft, a resin coating provided on the splines on at least one of the outer and inner shafts, and is capable of being extended and contracted in an axial direction, includes: a step of press-fitting the inner shaft into the outer shaft; and a step of sliding one of the outer and inner shafts relative to the other of the outer and inner shafts by reciprocating the one of the outer and inner shafts in the axial direction. In the sliding step, a frequency according to a sliding speed at which the one of the outer and inner shafts is slid relative to the other of the outer and inner shafts is set to be lower than a predetermined value at the start of sliding, and the frequency is increased in a continuous or stepwise manner when a sliding load of the one of the outer and inner shafts to the other of the outer and inner shafts is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described with reference to the accompanying drawings.

Figure 1:
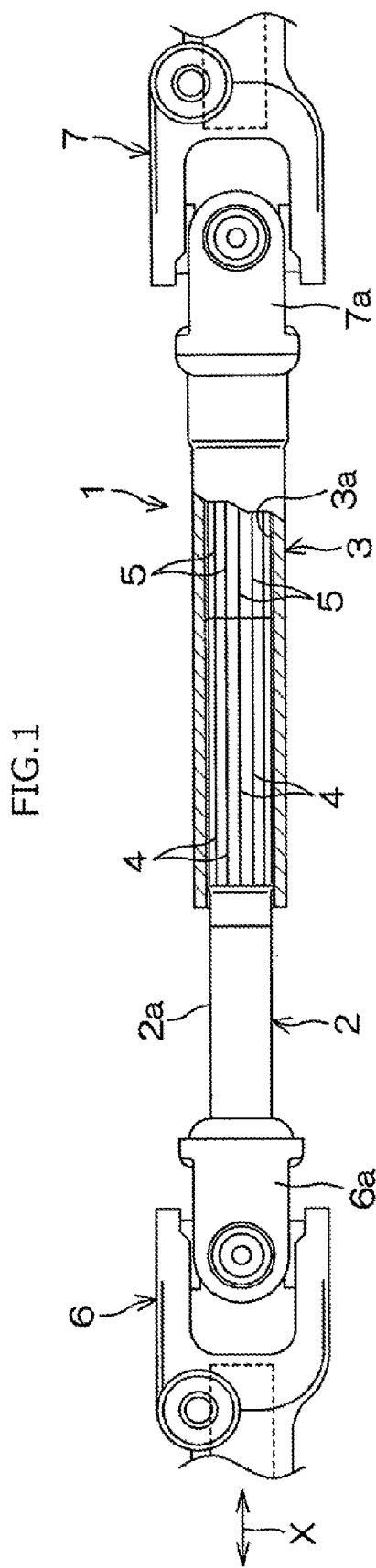
FIG. 1 is a partially sectional side view of a telescopic shaft manufactured by a manufacturing method according to an embodiment of the invention.

FIG. 1 is a partially sectional side view of a telescopic shaft manufactured by a manufacturing method according to an embodiment of the invention. A telescopic shaft 1 may be used as, for example, an intermediate shaft interposed between a steering shaft (not shown) and a pinion shaft (not shown) of a rack-and-pinion mechanism in a steering apparatus. The telescopic shaft 1 may be also used as a steering shaft that is contracted during impact absorption.

The telescopic shaft 1 includes an inner shaft 2 and a hollow outer shaft 3, which are coaxially coupled to each other. Each of the inner shaft 2 and the outer shaft 3 is made of metal. The inner shaft 2 and the outer shaft 3 are spline-fitted to each other so as to be slidable relative to each other in an axial direction X of the telescopic shaft 1 and so as to transmit torque to each other. The telescopic shaft 1 can be thus extended and contracted in the axial direction X.

Splines 4 are formed on an outer periphery 2a of the inner shaft 2, and splines 5 are formed on an inner periphery 3a of the outer shaft 3 and is alternately meshed with the splines 4. The splines 4 are male splines, and the splines 5 are female splines. The splines 4, 5 are schematically shown in FIG. 1.

Figure 2:
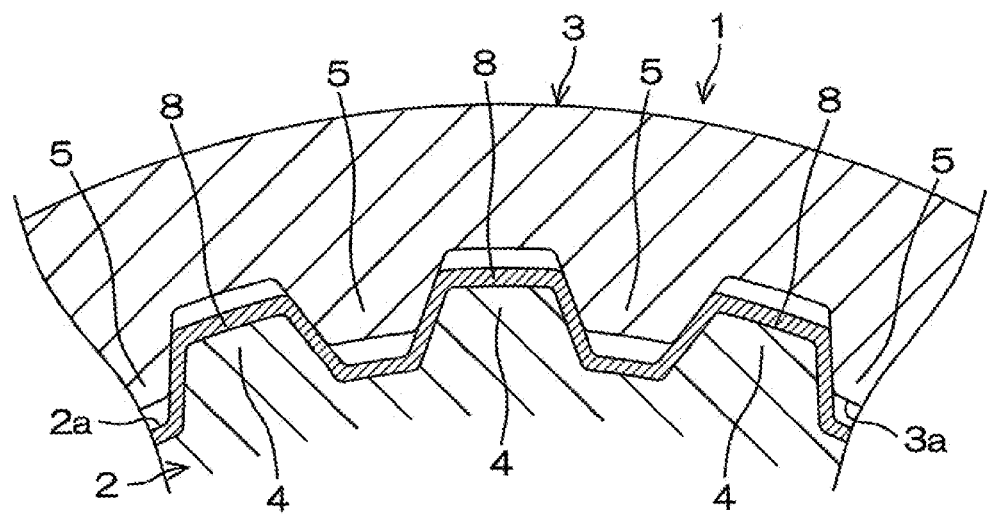
FIG. 2 is a sectional view of a main part of the telescopic shaft.

In the case where the telescopic shaft 1 forms an intermediate shaft, a yoke 6a of a universal joint 6 is integrally attached to one end of the inner shaft 2, as shown in FIG. 1. A yoke 7a of a universal joint 7 is integrally attached to one end of the outer shaft 3. FIG. 2 is a sectional view of a main part of the telescopic shaft 1. As shown in FIG. 2, a resin coating 8 is provided on a surface of the splines 4 of the inner shaft 2 so as to coat the surface. The resin coating 8 forms a part of the telescopic shaft 1 and is formed of synthetic resin. Examples of the synthetic resin include thermoplastic resins such as polyamide or polyacetal and thermosetting resins such as an epoxy resin. The resin coating 8 is interposed between the splines 4 of the inner shaft 2 and the splines 5 of the outer shaft 3 so as to minimize a backlash between the splines 4 and the splines 5 and maintain sliding resistance between the inner shaft 2 and the outer shaft 3 to a predetermined value.

Figure 3A:
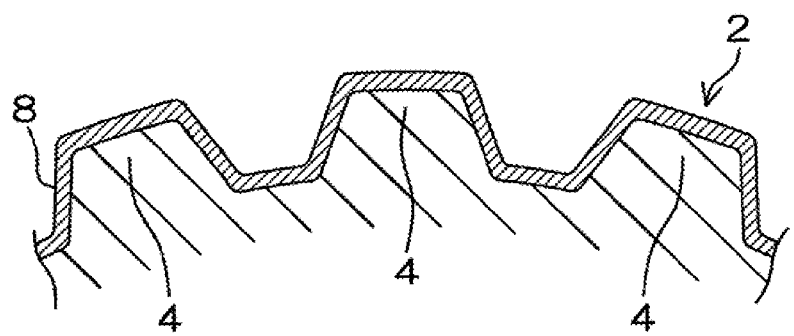
FIG. 3A is a schematic sectional view of an inner shaft coated by a resin coating.
Figure 3B:
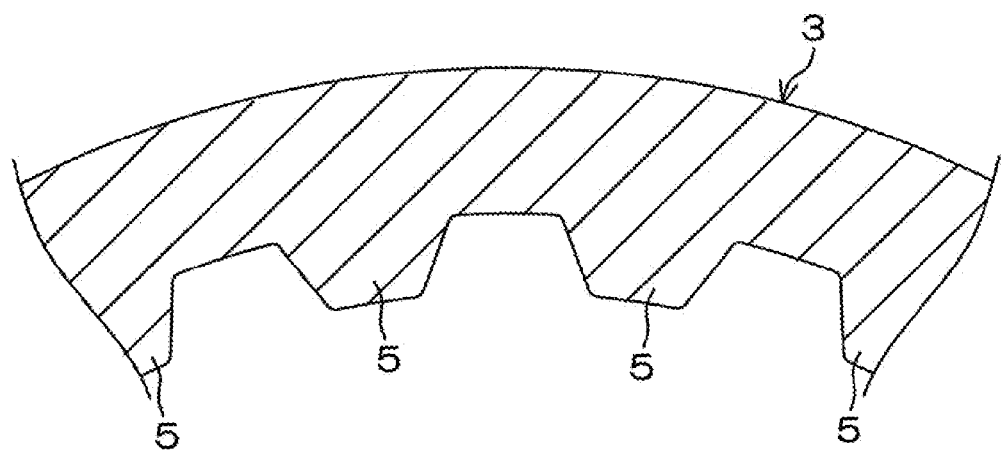
FIG. 3B is a schematic sectional view of an outer shaft.
Figure 4:
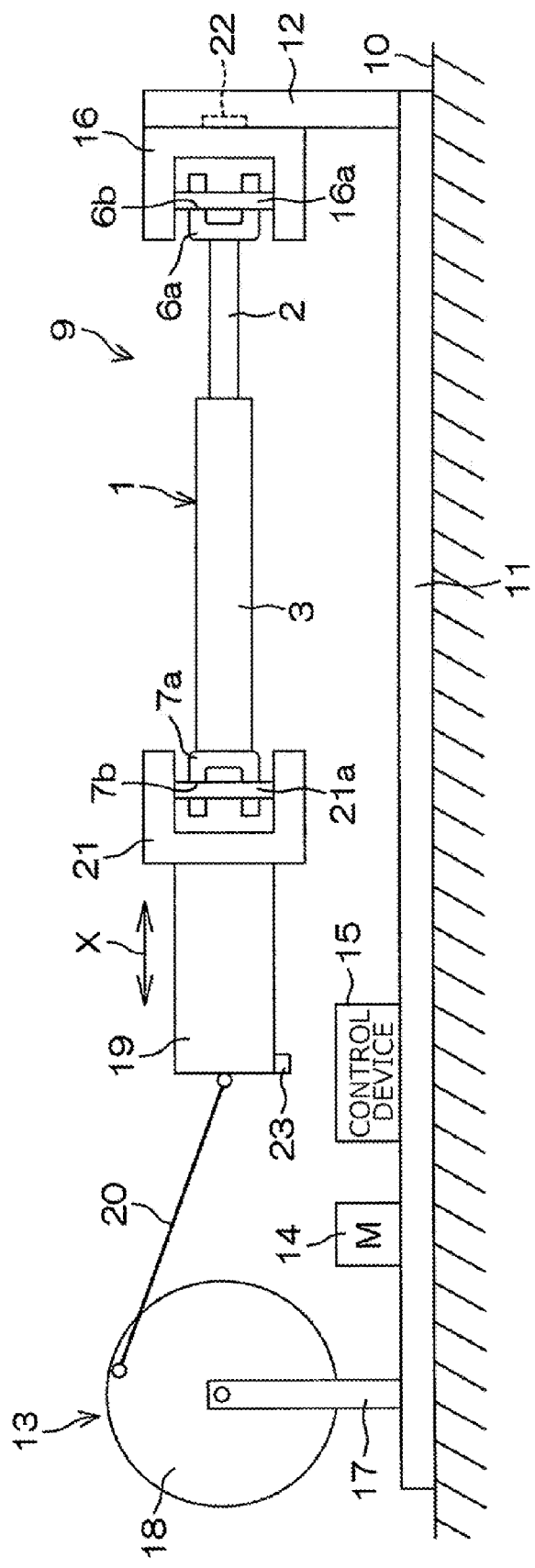
FIG. 4 is a schematic view of a facility used in a sliding step of sliding the outer shaft relative to the inner shaft.

When the telescopic shaft 1 is manufactured, first, the inner shaft 2 (see FIG. 3A) and the outer shaft 3 (see FIG. 3B) are separately prepared. The surface of the splines 4 of the inner shaft 2 is coated by the resin coating 8. The inner shaft 2 is fitted to an inner periphery of the outer shaft 3 with the negative fitting clearance interposed therebetween. That is, the inner shaft 2 is press-fitted into the outer shaft 3. Then, the inner shaft 2 and the outer shaft 3 are attached to a facility 9 shown in FIG. 4.

The facility 9 mainly includes a base 11, a supporting frame 12, a crank mechanism 13, a motor 14, and a control device 15, for example. The base 11 extends in a horizontal direction and is fixed to a floor 10. The supporting frame 12 is fixed on the base 11. The facility 9 will be described below using the axial direction X.

The supporting frame 12 stands upright from the base 11, and a first attachment bracket 16 is attached to an upper end of the supporting frame 12. The yoke 6a attached to the inner shaft 2 is fixed to the first attachment bracket 16. Specifically, a pin 16a located on the side closer to the first attachment bracket 16 is passed through a through hole 6b of the yoke 6a, into which a joint spider (not shown) of the universal joint 6 is fitted, such that the yoke 6a attached to the inner shaft 2 is positioned in the axial direction X by the first attachment bracket 16.

The crank mechanism 13 includes a rotating disk 18, a slide member 19, and a link member 20. The rotating disk 18 is rotatably supported by a supporting arm 17 that stands upright from the base 11. The slide member 19 can slide only in the axial direction X. The link member 20 links the slide member 19 and one position on a periphery of the rotating disk 18. A drive force from the motor 14 fixed to the base 11 is transmitted to the rotating disk 18 by a transmission mechanism (not shown) such that the rotating disk 18 rotates. A rotary motion of the rotating disk 18 is transformed into a reciprocating motion of the slide member 19 in the axial direction X by the link member 20.

A second attachment bracket 21 is attached to an end of the slide member 19, which is located on the opposite side of the slide member 19 from the side connected to the link member 20. The second attachment bracket 21 faces the first attachment bracket 16 in the axial direction X. The yoke 7a attached to the outer shaft 3 is fixed to the second attachment bracket 21. Specifically, a pin 21a located on the side closer to the second attachment bracket 21 is passed through a through hole 7b of the yoke 7a, into which a joint spider (not shown) of the universal joint 7 is fitted, such that the yoke 7a attached to the outer shaft 3 is coupled to the second attachment bracket 21.

As described above, with the inner shaft 2, which is press-fitted into the outer shaft 3, coupled to the first attachment bracket 16, and with the outer shaft 3 coupled to the second attachment bracket 21, the motor 14 is driven to rotate the rotating disk 18. The outer shaft 3 is thus reciprocated together with the slide member 19 in the axial direction X so as to be forcibly slid relative to the inner shaft 2. By such sliding step, a surface of the resin coating 8 provided on the splines 4 of the inner shaft 2 is melted by frictional heat generated by sliding such that the surface of the resin coating 8 is formed so as to conform to a shape of a surface of the splines 5 of the outer shaft 3 (see FIG. 2). The tooth profiles of the outer shaft 3 and the inner shaft 2 are thus formed such that the sliding resistance between the outer shaft 3 and the inner shaft 2 is set to a predetermined value.

In the sliding step, torsional torque may be applied or may not be applied between the inner shaft 2 and the outer shaft 3. In the facility 9, a load sensor 22 for detecting a sliding load is provided on the first attachment bracket 16. The first attachment bracket 16 receives a load applied from the outer shaft 3 that slides relative to the inner shaft 2 (referred to as a sliding load of the outer shaft 3 to the inner shaft 2). The sliding load of the outer shaft 3 to the inner shaft 2 corresponds to the sliding resistance between the inner shaft 2 and the outer shaft 3.

In addition, a position sensor 23 is provided in the facility 9. The position sensor 23 detects a position of the slide member 19 in the axial direction X. Signals from the load sensor 22 and the position sensor 23 are sent to the control device 15. The control device 15 outputs a control signal to the motor 14 based on positional information detected by the position sensor 23 and information on speed obtained by differentiating the positional information (corresponding to a sliding speed of the outer shaft 3 relative to the inner shaft 2) and allows the outer shaft 3 to slide relative to the inner shaft 2 at a target sliding speed (in a strict sense, a target frequency as will be described below). The control device 15 terminates the sliding step when the sliding load detected by the load sensor 22 is reduced to a target value.

When F is the sliding load in the sliding step, the sliding load F is represented by the following formula (1).

$$F = m \cdot a = m \cdot \omega^2 \cdot r = m \cdot (2 \cdot \pi \cdot f)^2 \cdot r \quad \text{Formula (1)}$$

In the formula, m is generally an actual weight of the reciprocating outer shaft 3. In the present embodiment, however, m is a sliding load when the sliding speed is a very low speed (for example, 0.01 m/s) and is also a constant obtained in advance by measurement or the like. In the formula, a is an absolute value of acceleration of the reciprocating outer shaft 3 and the slide member 19, ω is an angular speed of the rotating disk 18, r is a stroke (a sliding stroke) of the outer shaft 3, which is a half of a reciprocation distance of the outer shaft 3, and is a radius of the rotating disk 18, f is a frequency of rotation of the rotating disk 18 and is a frequency according to the sliding speed at which the outer shaft 3 is slid relative to the inner shaft 2 (a sliding frequency), and π is the ratio of the circumference of a circle to its diameter.

When v is the sliding speed, the relationship between the frequency f and the sliding speed v is represented by the following formula (2).

$$f = v/(2\pi \cdot r) \quad \text{Formula (2)}$$

Figure 5A:
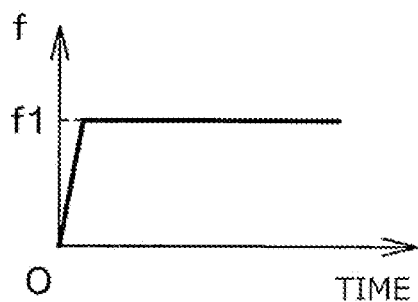
FIGS. 5A, 5B, 5C, and 5D are graphs showing temporal changes in a sliding load and a frequency.
Figure 5C:
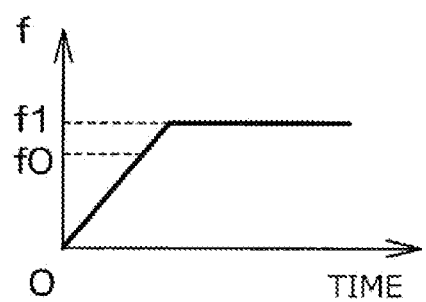
Figure 5B:
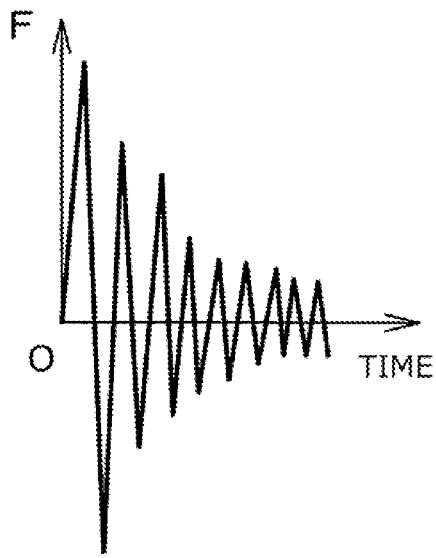

As shown in FIG. 5A, when the frequency f is rapidly increased to a target frequency f1 at the start of sliding in the sliding step and remains constant at the target frequency f1 until the termination of the sliding step, the sliding load F at the start of sliding is extremely high, as shown in FIG. 5B. The connection between the inner shaft 2 and the yoke 6a and the connection between the outer shaft 3 and the yoke 7a (see FIG. 1) are thus required to be performed by welding in order to withstand the high sliding load F. This makes it difficult to achieve reduction in cost and weight of the telescopic shaft 1.

In recent steering apparatuses, a steering assist force, which is generated by a motor or the like in order to assist the steering of a steering wheel by a user, is transmitted not to a shaft located on a steering side (on an upstream side) such as a steering shaft and an intermediate shaft but another shaft located on a rack-and-pinion mechanism side (a downstream side). A load applied to the telescopic shaft 1, to which the steering assist force is not transmitted, is small under normal use. If the strength was required to be secured only in order to withstand the sliding load in the sliding step rather than under normal use, reduction in cost and weight of the telescopic shaft 1 could not be achieved.

If the sliding load at the start of sliding is low, the connection between the inner shaft 2 and the yoke 6a and the connection between the outer shaft 3 and the yoke 7a can be performed in a simple manner without welding, such as by a press-fitting, swaging, or pressing. When the frequency f in the case where a sliding load F0 at the start of sliding is 5 (kN), for example, is a predetermined value f0, the predetermined value f0 is represented by the following formula (3).

$$f0 = (F0/(4 \cdot \pi^2 \cdot m \cdot r))^{1/2} \quad \text{Formula (3)}$$

Figure 5D:
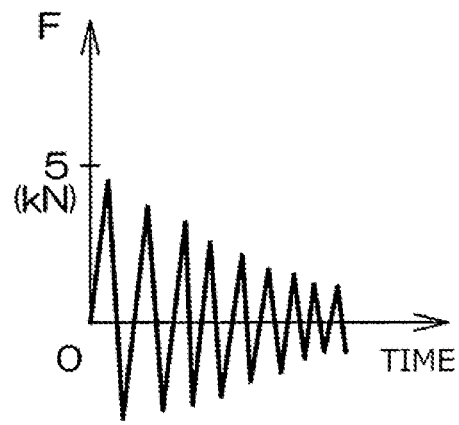

In the sliding step, as shown in FIG. 5C, the frequency f at the start of sliding (including a predetermined period of time from the start of sliding) is set to be lower than the predetermined value f0. Lowering the frequency f corresponds to lowering the acceleration a of the slide member 19 that is the moving part in the facility 9 for sliding the outer shaft 3. The outer shaft 3 can be thus slid at a low speed at the start of sliding so as to reduce the influence of the inertia of the slide member 19, and the absolute value of the sliding load F (F0) at the start of sliding can be reduced to a low value of less than 5 (kN), as shown in FIG. 5D. Therefore, the sliding load F (F0) applied to the outer shaft 3 and the inner shaft 2 at the start of sliding is reduced, whereby the minimum strength that needs to be secured at the various parts of the outer shaft 3 and the inner shaft 2 can be reduced. This can achieve the reduction in cost and weight of the telescopic shaft 1.

Figure 6:
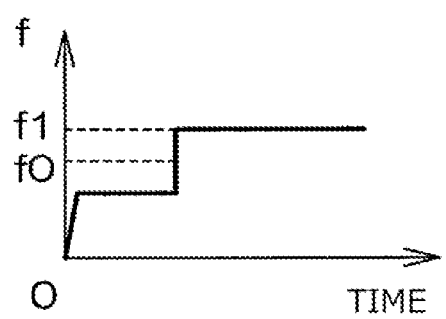
FIG. 6 is a graph showing a temporal change in a frequency according to a modification.

As the formation of the tooth profiles of the outer shaft 3 and the inner shaft 2 proceeds for some time after the start of sliding, the sliding load F (also, the sliding resistance) is reduced to a target value. As shown in FIG. 5C, the frequency f is increased to a target frequency f1 so as to allow the outer shaft 3 to slide at a high speed. Accordingly, the resin coating 8 provided on the splines 4, 5 (the splines 4 in this embodiment) is melted by the frictional heat generated in the sliding step and is formed into a tooth flank shape of the splines 4, 5 so as to conform to the tooth profiles of the splines 4, 5 of the inner shaft 2 and the outer shaft 3. The sliding resistance between the inner shaft 2 and the outer shaft 3 (between the splines of the inner shaft 2 and the outer shaft 3) can be thus set to a predetermined value. In the case where the frequency f is increased to the target frequency f1, the frequency f may be increased in a continuous manner so as to be linearly changed, as shown in FIG. 5C, or may be increased in a stepwise manner, as shown in FIG. 6.

As a specific example of the predetermined value f0 and the target frequency f1, in the case where the predetermined value f0 that is the frequency at the start of sliding is 0 to 3.5 (Hz), the target frequency f1 can be set to 5 to 8 (Hz). The invention is not limited to the above embodiment, and various modifications can be made without departing from the spirit and scope of the invention.

In the above embodiment, the resin coating 8 is provided only on the splines 4 of the inner shaft 2. However, the resin coating 8 may be provided only on the splines 5 of the outer shaft 3 or may be formed on both the splines 4, 5. The resin coating 8 only needs to be provided on at least one of the splines 4, 5 of the inner shaft 2 and the outer shaft 3. In addition, in the sliding step, the outer shaft 3 is slid by the drive force from the motor 14. However, the outer shaft 3 may be slid by hydraulic pressure of a hydraulic cylinder provided in the facility 9.

Furthermore, in the sliding step, the outer shaft 3 is reciprocated to be slid relative to the inner shaft 2. However, the inner shaft 2 may be reciprocated to be slid relative to the outer shaft 3. That is, in the sliding step, one of the inner shaft 2 and the outer shaft 3 only needs to be reciprocated in the axial direction X so as to be slid relative to the other of the inner shaft 2 and the outer shaft 3.

What is claimed is:

1. A method for manufacturing a telescopic shaft that includes a hollow outer shaft having splines formed on its inner periphery, an inner shaft that has splines formed on its outer periphery and is spline-fitted to the outer shaft, a resin coating provided on the splines on at least one of the outer and inner shafts, and is capable of being extended and contracted in an axial direction, the method comprising:
   press-fitting the inner shaft into the outer shaft; and
   sliding one of the outer and inner shafts relative to the other of the outer and inner shafts by reciprocating the one of the outer and inner shafts in the axial direction, wherein
   in the sliding, a frequency according to a sliding speed at which the one of the outer and inner shafts is slid relative to the other of the outer and inner shafts is set at a start of sliding to be lower than a predetermined value, and the frequency is increased in a continuous or stepwise manner when a control unit detects that a sliding load of the one of the outer and inner shafts to the other of the outer and inner shafts is reduced to a target value.

2. The method for manufacturing a telescopic shaft according to claim 1, wherein
   when f0 is the predetermined value, r is a stroke of the one of the outer and inner shafts, which is a half of a reciprocation distance of the one of the outer and inner shafts, m is the sliding load when the sliding speed is a very low speed, and F0 is the sliding load at the start of sliding, the predetermined value f0 is represented by the following formula.

$$f0 = (F0/(4 \cdot \pi^2 \cdot m \cdot r))^{1/2}$$

3. The method for manufacturing a telescopic shaft according to claim 1, wherein
   the resin coating provided on the splines on the at least one of the outer and inner shafts is melted by frictional heat generated in the sliding and is formed into a tooth flank shape of the splines.

4. The method for manufacturing a telescopic shaft according to claim 2, wherein the resin coating provided on the splines on the at least one of the outer and inner shafts is melted by frictional heat generated in the sliding and is formed into a tooth flank shape of the splines.

* * * * *